(12) United States Patent
Kim et al.

(10) Patent No.: US 8,948,401 B2
(45) Date of Patent: Feb. 3, 2015

(54) METHOD FOR FILTERING OF ABNORMAL ONT WITH SAME SERIAL NUMBER IN A GPON SYSTEM

(75) Inventors: Kwang-ok Kim, Jeollabuk-do (KR);
Geun-yong Kim, Goyang-si (KR);
Dong-soo Lee, Gwangju-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 703 days.

(21) Appl. No.: 12/747,345

(22) PCT Filed: Jul. 16, 2009

(86) PCT No.: PCT/KR2009/003937
§ 371 (c)(1),
(2), (4) Date: Jun. 10, 2010

(87) PCT Pub. No.: WO2010/038938
PCT Pub. Date: Apr. 8, 2010

(65) Prior Publication Data
US 2010/0272259 A1    Oct. 28, 2010

(30) Foreign Application Priority Data
Oct. 2, 2008    (KR) .................. 10-2008-0096978

(51) Int. Cl.
*H04L 9/08*    (2006.01)
*H04L 9/32*    (2006.01)
*H04L 29/06*    (2006.01)
(Continued)

(52) U.S. Cl.
CPC .............. *H04L 9/32* (2013.01); *H04L 63/0236* (2013.01); *H04L 63/0442* (2013.01); *H04L 63/0876* (2013.01); *H04L 63/162* (2013.01);
(Continued)

(58) Field of Classification Search
CPC .............. H04L 63/0428; H04L 63/162; H04L 63/0442; H04L 63/061; H04L 63/0876; H04L 9/0816; H04Q 11/0067
USPC ............ 713/150, 153, 163, 189, 191; 380/30, 380/285; 370/236, 236.2
See application file for complete search history.

(56) References Cited

U.S. PATENT DOCUMENTS 7,450,719 B2    11/2008 Lee et al.
7,818,389 B1 *  10/2010 Chiang et al. ................. 709/212
(Continued)

FOREIGN PATENT DOCUMENTS

KR    10-2003-0088643 A    11/2003
KR    10-2005-0021794 A    3/2005

*Primary Examiner* — Evans Desrosiers
*Assistant Examiner* — Daniel Potratz
(74) *Attorney, Agent, or Firm* — Rabin & Berdo, P.C.

(57) ABSTRACT

Disclosed is a method of registering only an authorized optical network terminal among a plurality of optical network terminals with the same serial number, in an optical line terminal, using a public key encryption algorithm, in a Gigabit Passive Optical Network (GPON). According to an exemplary aspect, a GPON system encrypts a physical layer OAM message transmitted/received for serial number registration of an optical network terminal, using a key distributed according to a public key encryption algorithm, and authenticates registration of the optical network terminal using the encrypted physical layer OAM message. Accordingly, it is possible to securely authenticate registration of an authorized optical network terminal and block registration of unauthorized optical network terminals.

19 Claims, 10 Drawing Sheets

(51) Int. Cl.
  *H04K 1/00* (2006.01)
  *H04L 9/00* (2006.01)
  *H04L 9/30* (2006.01)
  *G06F 11/30* (2006.01)
  *G06F 12/14* (2006.01)
  *H04Q 11/00* (2006.01)
(52) U.S. Cl.
  CPC ............. *H04L9/0825* (2013.01); *H04L 9/0816* (2013.01); *H04L 63/061* (2013.01); *H04Q 11/0067* (2013.01)
  USPC .............. 380/285; 380/30; 173/189; 173/191

(56) References Cited

U.S. PATENT DOCUMENTS

| | | | |
|---|---|---|---|
| 8,027,473 B2* | 9/2011 | Stiscia et al. | 380/256 |
| 2005/0008158 A1* | 1/2005 | Huh et al. | 380/256 |
| 2005/0047602 A1* | 3/2005 | Lee et al. | 380/284 |
| 2005/0135609 A1 | 6/2005 | Lee et al. | |
| 2006/0129814 A1 | 6/2006 | Eun et al. | |
| 2008/0040604 A1 | 2/2008 | Kim et al. | |

\* cited by examiner

Fig. 14

| | |
|---|---|
| 1Byte | ONU ID |
| 1Byte | Message ID |
| 1Byte | Key Index |
| 1Byte | Frag Index |
| 8Byte | Key Data |
| 1Byte | CRC |

METHOD FOR FILTERING OF ABNORMAL ONT WITH SAME SERIAL NUMBER IN A GPON SYSTEM

TECHNICAL FIELD

The following description relates to network technology, and more particularly, to a Gigabit Passive Optical Network (GPON) system.

BACKGROUND ART

A Gigabit Passive Optical Network (GPON) provides a network of large bandwidth to subscribers to execute various multi-protocols. A GPON, which is one Fiber-To-The-Home (FTTH) service standardized by the International Telecommunications Union-Telecommunication Standardization Sector (ITU-T), has a structure where a plurality of optical network terminals (ONTs, or also referred to as optical network units (ONUs)) are connected to a single optical line terminal (OLT) through a passive element by a Point-to-Multipoint (PTM) method.

An OLT, which is a multi-service unit for connecting an optical subscriber network to another system, may be any one of a Service Interface and Protocol Processing (SIPP) unit, a CATV, a transmitter, a network manager and the like. An OLT or ONU is a network terminator which can connect to a Fiber-To-The-User (FTTU) system which is one kind of next-generation network.

DISCLOSURE OF INVENTION

Technical Problem

The following description relates to a Gigabit Passive Optical Network (GPON) system which blocks registration of unauthorized optical network terminals (ONTs), and a registration authentication method thereof.

Technical Solution

The present invention provides a method of authenticating registration of an optical network terminal, using a physical layer OAM message associated with registration of a serial number of the optical network terminal and encrypted with a key distributed in advance to the optical network terminal according to a public key encryption algorithm.

According to an exemplary aspect, there is provided a method in which an optical network terminal obtains a registration approval from an optical line terminal in a Gigabit passive optical network (GPON), including: at the optical network terminal, being assigned an OLT public key when the optical network terminal joins the GPON; and at the optical network terminal, encrypting a header of a frame associated with registration of the optical network terminal using the public key or a key created based on the public key, and obtaining the registration approval from the optical line terminal using the frame with the encrypted header.

The obtaining of the registration approval includes: encrypting a physical layer OAM message included in a header of a frame associated with serial number registration using the OLT public key, transmitting the encrypted physical layer OAM message to the optical line terminal and obtaining registration for the serial number from the optical line terminal; generating an ONT public key and an ONT private key in response to the registration for the serial number and transmitting the ONT public key to the optical line terminal; and encrypting a physical layer OAM message included in a header of a frame associated with ranging registration, using the ONT private key and the ONT public key, transmitting the encrypted physical layer OAM message to the optical line terminal, and obtaining ranging registration for a distance between the optical line terminal and the optical network, from the optical line terminal.

According to another exemplary aspect, there is provided a method in which an optical line terminal authenticates registration of an optical network terminal in a Gigabit passive optical network (GPON), including: at the optical line terminal, being assigned a OLT private key; and at the optical line terminal, decrypting a header of a frame associated with the registration of the optical network terminal using the OLT private key or a key received from the optical network terminal, and registering the optical network terminal using the frame with the decrypted header.

The registration of the optical network terminal includes: registering a serial number of the optical network terminal using a physical layer OAM message associated with serial number registration included in the header of the frame associated with the registration of the optical network terminal; receiving an ONT public key created by the optical network terminal from the optical network terminal in response to the registration of the serial number; and encrypting a ranging physical layer OAM message using the ONT public key and transmitting the encrypted ranging physical layer OAM message to the optical network terminal, thereby performing ranging registration for a distance between the optical line terminal and the optical network, from the optical line terminal.

According to another exemplary aspect, there is provided an optical network terminal which obtains a registration approval from an optical line terminal in a Gigabit Passive Optical Network (GPON), the optical network terminal including: a key creator to create an ONT private key and an ONT public key; an encryption/decryption unit to encrypt a header of a frame associated with registration of the optical network terminal, using an OLT public key assigned to the optical network terminal when the optical network terminal joins the GPON, or using a key created by the key creator, to transmit the encrypted header of the frame to the optical line terminal, and to decrypt a message received from the optical line terminal using the assigned key or the created key; and an authentication unit obtaining a registration approval from the optical line terminal according to the result of the decryption.

If the encryption/decryption receives a physical layer OAM message associated with registration of a serial number, encrypted using an OLT public key, in order to register a serial number of the optical network terminal, the encryption/decryption unit decrypts the physical layer OAM message using the key externally assigned.

According to another exemplary aspect, there is provided a Gigabit Passive Optical Network (GPON) including: an optical network terminal to encrypt or decrypt a header of a frame associated with registration, using a public key assigned to the optical network terminal when the optical network terminal joins the GPON or using a key created based on the public key; and an optical line terminal to encrypt or decrypt the header of the frame using a key externally assigned or a key created by or received from the optical network terminal, and to authenticate registration of the optical network terminal according to the result of the encryption/decryption.

Additional features of the invention will be set forth in the description which follows, and in part will be apparent from the description, or may be learned by practice of the invention.

Advantageous Effects

As described above, since there are provided a Gigabit Passive Optical Network (GPON) system which blocks registration of an unauthorized optical network terminal, and a registration authentication method thereof, it is possible to securely authenticate registration of authorized optical network terminals and block registration of unauthorized optical network terminals. In addition, since the encryption algorithm is implemented using software, it may be easily applied without having to modify hardware.

BRIEF DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

FIG. 14 is a diagram illustrating a structure of a key response PLOAM message using encryption according to an exemplary embodiment.

MODE FOR THE INVENTION

Figure 1:
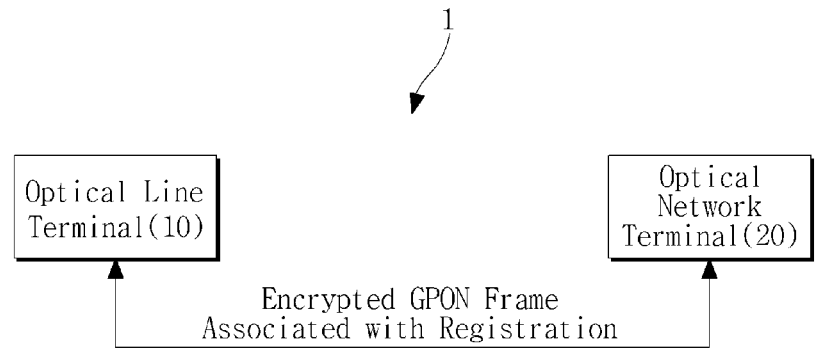
FIG. 1 is a block diagram schematically illustrating a configuration of a Gigabit Passive Optical Network (GPON) system according to an exemplary embodiment.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram schematically illustrating a configuration of a Gigabit Passive Optical Network (GPON) system 1 according to an exemplary embodiment.

Referring to FIG. 1, the GPON system 1 includes an optical network (ONT) terminal 20 and an optical line terminal (OLT) 10. The optical network terminal 20 may be also called an optical network unit (ONU).

In the GPON system 1, the optical line terminal 10 and optical network terminal 20 process registration authentication by transmitting and receiving encrypted GPON frames associated with registration. This encryption is aimed at securely authenticating registration of authorized optical network terminals while blocking registration of unauthorized optical network terminals.

The GPON system 1 may authenticate registration of the optical network terminal 20 by encrypting or decrypting a physical layer Operations, Administration and Maintenance (OAM) (hereinafter, simply referred to as PLOAM) message included in a GPON transmission convergence (GTC) frame which is a GPON frame associated with registration. A PLOAM message is one piece of information included in a header of a GTC frame, which is transmitted together with a payload when registration authentication is processed. The PLOAM message according to the current embodiment has security as encrypted before transmission. An encryption structure of the PLOAM message will be described later with reference to FIGS. 13 and 14.

A conventional GPON system registers optical network terminals without authenticating their serial numbers. Accordingly, when two or more optical network terminals with the same serial number exist in the GPON system, registration of unauthorized optical network terminals may occur. Moreover, since PLOAM messages are not encrypted before transmission, they may be easily exposed to external positions. If the serial numbers of optical network terminals are externally exposed, quality of service (QoS) may not be guaranteed for subscribers.

However, the GPON system 1 according to the current embodiment protects PLOAM messages that are transmitted through a GPON link, by using a public key encryption scheme. Accordingly, according to the current embodiment, when registration of optical network terminals is authenticated, their serial numbers are never easily externally exposed. Moreover, even when two or more optical network terminals with the same serial number exist due to exposure of serial numbers, only an authorized optical network terminal is allowed to be registered so that QoS is guaranteed.

Figure 2:
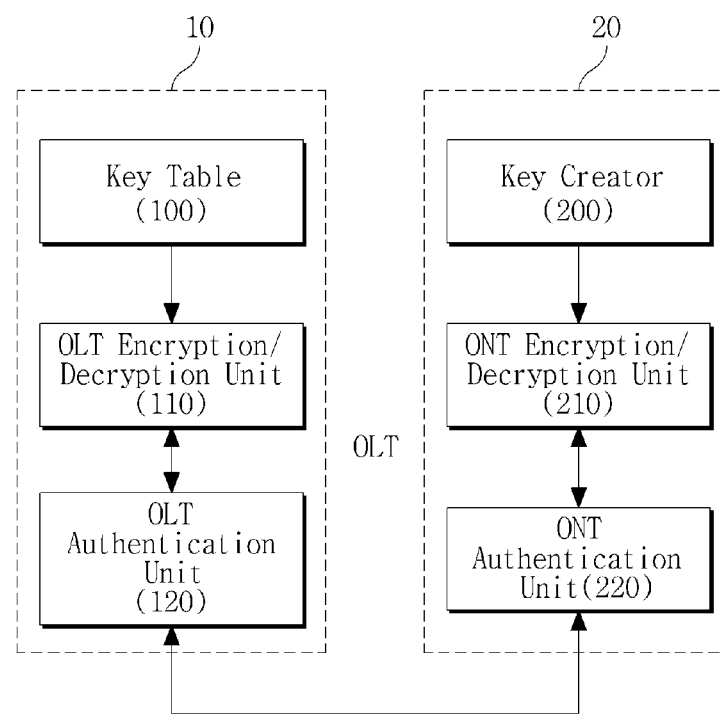
FIG. 2 is a block diagram illustrating an optical line terminal and an optical network terminal included in the GPON system illustrated in FIG. 1.

FIG. 2 is a block diagram illustrating the optical line terminal 10 and optical network terminal 20 included in the GPON system 1 illustrated in FIG. 1.

Referring to FIG. 2, the optical network terminal 20 encrypts a PLOAM message included in a frame associated with registration, using a public key assigned when the optical network terminal 20 joins the GPON or using a key created based on the public key, and transmits the encrypted PLOAM message to the optical line terminal 10. Meanwhile, the optical line terminal 10 receives and decrypts the PLOAM message from the optical network terminal 20, using a key externally assigned or using a key created by and received from the optical network terminal 20, thereby authenticating registration of the optical network terminal 20 according to the result of the decryption.

In detail, the optical network terminal 20 includes a key creator 200, an ONT encryption/decryption unit 210 and an ONT authentication unit 220. The key creator 200 creates an ONT private key and ONT public key. The ONT encryption/decryption unit 210 encrypts or decrypts a PLOAM message of a frame associated with registration, using a key assigned when the optical network terminal 20 joins the GPON or using a key created by the key creator 200. The ONT authentication unit 220 obtains a registration approval from the optical line terminal 10 by transmitting the result of encryption or decryption to the optical line terminal 10.

Meanwhile, the optical line terminal 10 includes a key table 100, an OLT encryption/decryption unit 110 and an OLT authentication unit 120. The key table 100 stores ONT public keys created by and received from optical network terminals (each 20). The OLT encryption/decryption unit 110 encrypts or decrypts a PLOAM message of a frame associated with registration, using a key externally assigned or using a key created by and received from the optical network terminal 20. The OLT authentication unit 120 authenticates registration of the optical network terminal 20 according to the result of the encryption or decryption.

In the GPON system according to the current embodiment, by using a public key encryption scheme, registration of unauthorized optical network terminals is blocked and only an authorized optical network terminal obtains a registration approval when two or more optical network terminals with the same serial number exist in the GPON. This registration authentication method includes several operations: serial number registration, key distribution and ranging registration. Hereinafter, authentication encryption between the optical line terminal 10 and optical network terminal 20 will be described in detail with reference to FIGS. 3, 4 and 5.

Figure 3:
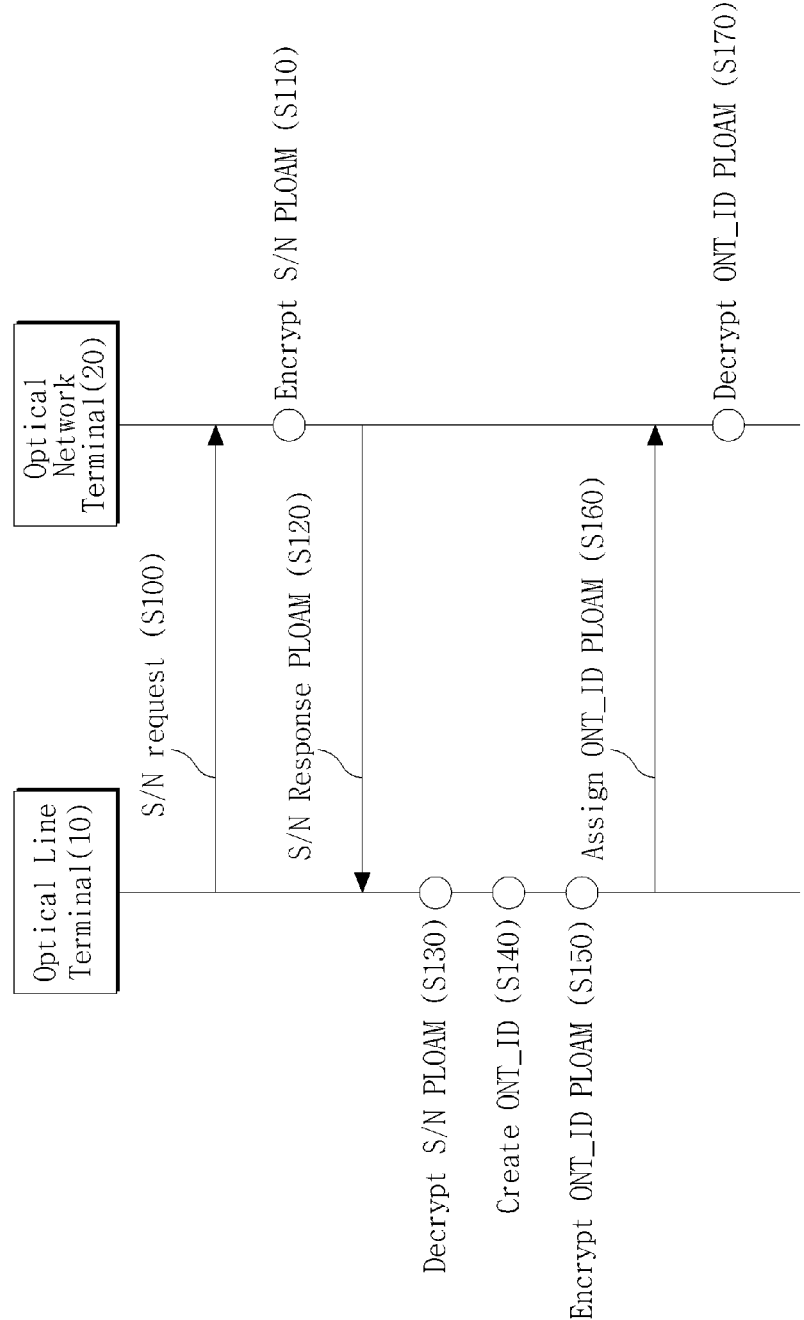
FIG. 3 is a flowchart illustrating a process of registering a serial number using encryption according to an exemplary embodiment.

FIG. 3 is a flowchart illustrating a process of registering a serial number using encryption according to an exemplary embodiment.

Referring to FIG. 3, an optical network terminal 20 of a GPON system encrypts a PLOAM message included in a frame associated with registration and transmits the encrypted PLOAM message to an optical line terminal 10, in order to obtain registration of a serial number of the optical network terminal 20. Then, the optical network terminal 20 is assigned an ONT identifier ONT-ID from the optical line terminal 10. Meanwhile, the optical line terminal 10 transmits a serial number request message to the optical network terminal 20. Then, if receiving the encrypted PLOAM message from the optical network terminal 20, the optical line terminal 10 decrypts the received PLOAM message and assigns the ONT identifier ONT-ID to the optical network terminal 20 according to the result of the decryption, thereby authenticating registration of the optical network terminal 20.

A conventional GPON system is vulnerable to attacks from unauthorized optical network terminals when serial numbers are being registered. For example in a conventional system, when an optical line terminal requests for an optical network terminal connected to the same GPON link to transmit its serial number, an unauthorized optical network terminal which has duplicated the serial number of the optical network terminal may respond to the serial number request. If a random delay time of the unauthorized optical network terminal is shorter than a random delay time of the authorized optical network terminal, a response from the unauthorized optical network terminal may reach the optical line terminal ahead of a response from the authorized optical network terminal. At this time, the optical line terminal assigns an ONT identifier ONT-ID to the serial number and registers the serial number therein, and thereafter, may ignore the following response received from the authorized optical network terminal since the serial number of the authorized optical network terminal is the same as the already registered serial number.

However, the GPON system of this disclosure solves the above-described problems by encrypting frames associated with registration in the process of registering serial numbers. In detail, the optical line terminal 10 transmits a serial number request message to the optical network terminal 20 to register a serial number of the optical network terminal 20 (S100). In response to the serial number request message, the optical network terminal 20 encrypts a PLOAM message included in a GPON transmission convergence (GTC) frame (S110) and transmits the encrypted PLOAM message as a serial number response message to the optical line terminal 10 (S120). The encryption may be performed on a 10-byte data area of the PLOAM message, which will be described later with reference to FIGS. 13 and 14. In 110, the optical network terminal 20 encrypts the PLOAM message using an OLT public key assigned when the optical network terminal 20 joins the GPON. The OLT public key may be provided to the optical network terminal 20 by a network operator when the optical network terminal 10 is installed in the GPON.

Subsequently, the optical line terminal 10 decrypts the received PLOAM message (S130) and generates an ONT identifier ONT-ID according to the result of the decryption (S140). Then, the optical line terminal 10 encrypts the generated ONT identifier ONT-ID (S150) and transmits the result of the encryption as an encrypted PLOAM message to the optical network terminal 20 (S160). Subsequently, the optical network terminal 20 decrypts the encrypted PLOAM message to be assigned the ONT identifier ONT_ID (S170). A process in which the optical line terminal 10 registers a serial number of the optical network terminal 120 will be described in detail later with reference to FIGS. 7 and 10.

Figure 4:
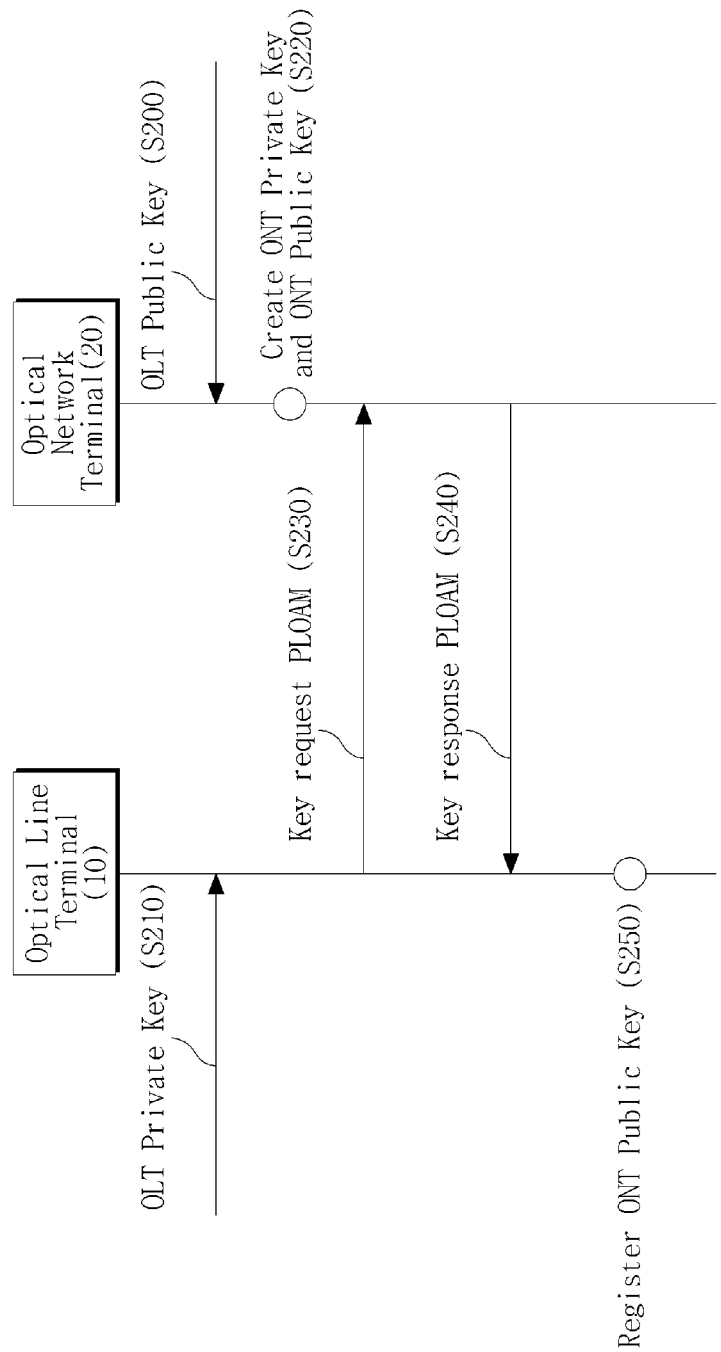
FIG. 4 is a flowchart illustrating a process of registering a public key, according to an exemplary embodiment.

FIG. 4 is a flowchart illustrating a process of registering a public key, according to an exemplary embodiment.

Referring to FIG. 4, in order to approve registration of authorized optical network terminals and block registration of unauthorized optical network terminals, a network manager assigns a private key shared in a GPON to an optical line terminal 10 and a public key to an optical network terminal 20.

In detail, the optical line terminal 10 and optical network terminal 20 are assigned an OLT private key and an OLT public key, respectively, from a network manager (S200 and S210). Subsequently, the optical network terminal 20, after the operation of registering the serial number as described above with reference to FIG. 3, creates an ONT private key and an ONT public key through the key creator 200 (see FIG. 2). That is, the optical network terminal 20 has an ONT private key created by itself, and an OLT public key of the optical line terminal 10 assigned when the optical network terminal 20 is installed. The private key and public key of the optical network terminal 20 are used to encrypt PLOAM messages in a process of performing ranging registration which will be described later.

The optical line terminal 10 requests the ONT public key of the optical network terminal 20 by transmitting a key request PLOAM message to the optical network terminal 20 (S230), and the optical network terminal 20 provides the ONT public key to the optical line terminal 10 by transmitting a key response PLOAM message to the optical line terminal 10 (S240). If the key response PLOAM message is regular, the optical line terminal 10 registers the ONT public key of the optical network terminal 20 in a key table. That is, the optical line terminal 10 includes the key table which stores its OLT private key and ONT public keys received from optical network terminals. The private key of the optical line terminal 10 and the ONT public key of the optical network terminal 20 are used to encrypt PLOAM messages for serial number registration.

Figure 5:
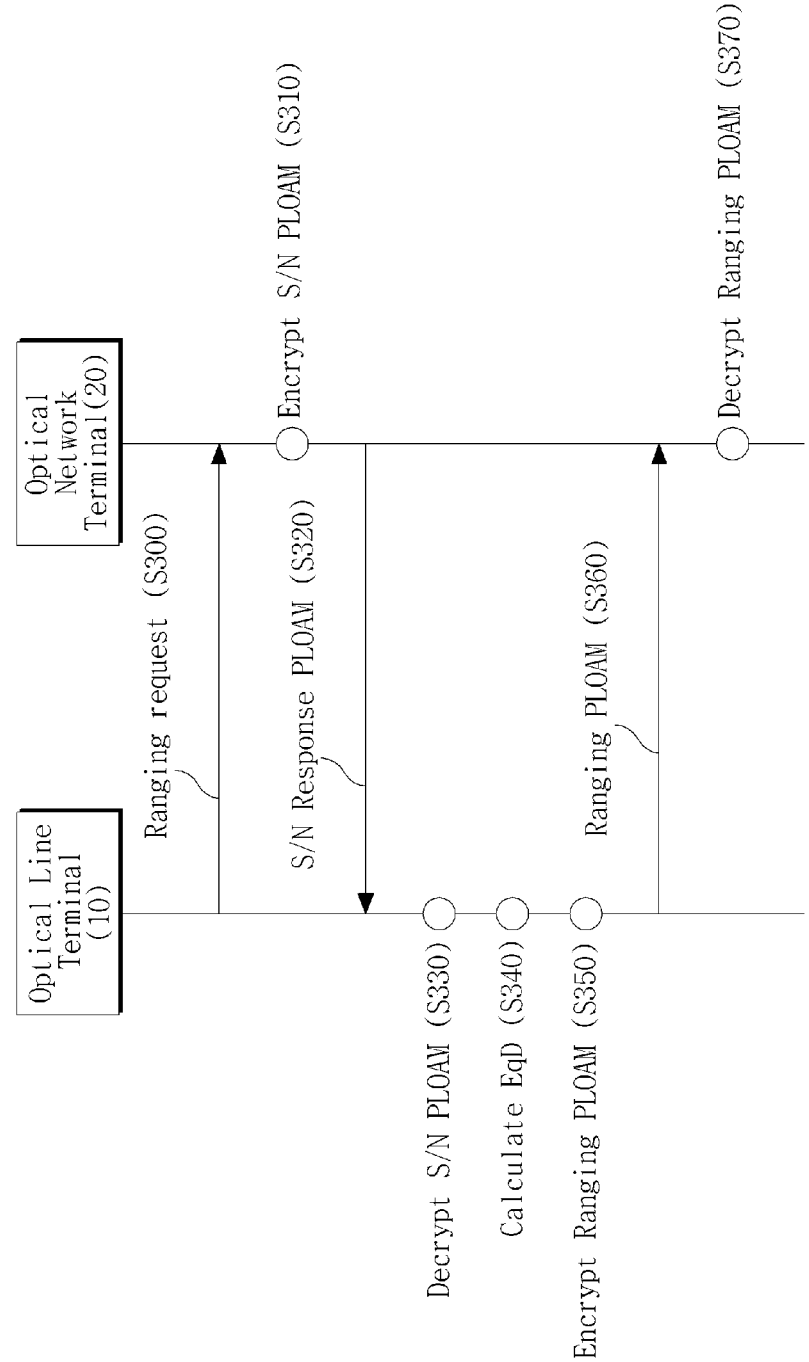
FIG. 5 is a flowchart illustrating a process of performing ranging registration, according to an exemplary embodiment.

FIG. 5 is a flowchart illustrating a process of performing ranging registration, according to an exemplary embodiment.

Referring to FIG. 5, an optical network terminal 20 of a GPON system transmits its serial number using an encrypted PLOAM message to the optical line terminal 10 for ranging registration. The optical line terminal 10 authenticates the serial number, and assigns an equalization delay value EqD to the optical network terminal 20 by transmitting an encrypted ranging PLOMA message to the optical network terminal 20.

The conventional GPON system may be attacked during ranging registration. For example, in the case where both an authorized optical network terminal and an unauthorized optical network terminal are assigned the same identifier ONT-ID, when a ranging request is issued for the ONT identifier ONT-ID, the two optical network terminals may simultaneously respond to the ranging request. In this case, the responses from the two optical network terminals collide with each other, which obstructs ranging registration of the authorized optical terminal. Or, even if the responses do not collide with each other, if the unauthorized optical network terminal is located closer to the optical line terminal than the authorized optical network terminal, the response from the unauthorized optical network terminal reaches the optical line terminal ahead of the response from the authorized optical network terminal. In this case, ranging registration for the unauthorized optical network terminal will be performed. Accordingly, the authorized optical network terminal will receive a wrong equalization delay value from the optical line terminal, which makes upward transmission of the authorized optical network impossible.

However, the GPON system according to the current embodiment may solve the above problem through authentication encryption of a frame associated with registration during ranging registration. In detail, the optical line terminal 10 transmits a ranging request message to the optical network terminal 20 for ranging registration (S300). Then, the optical network terminal 20 encrypts a PLOAM message of a header of a frame associated with registration (S310), and transmits the encrypted PLOAM message as a serial number response message to the optical line terminal 10 (S320). Here, the encryption may be performed on a 10-byte data area of the PLOAM message which will be described later. Also, the optical network terminal 20 encrypts the PLOAM message using an OLT public key assigned when the optical network terminal 20 is installed. The OLT public key may be provided by a network operator when the optical network terminal 20 is installed.

Subsequently, the optical line terminal 10 decrypts the received PLOAM message (S330) and calculates an equalization delay value EqD according to the result of the decryption (S340). Then, the optical line terminal 10 encrypts the equalization delay value EqD (S350) to generate an encrypted PLAM message and transmits the encrypted PLOAM message to the optical network terminal 20 (S360). Then, the optical network terminal 20 decrypts the encrypted PLAM message to be assigned the equalization delay value EqD (S370). The ranging registration operation between the optical network terminal 20 and optical line terminal 10 will be described in more detail later with reference to FIGS. 8 and 11.

Hereinafter, a method of authenticating registration of the optical network terminal 20 using encryption will be described in detail with reference to FIGS. 6 through 9, in which the method is composed of: serial number registration, public key distribution and ranging registration.

Figure 6:
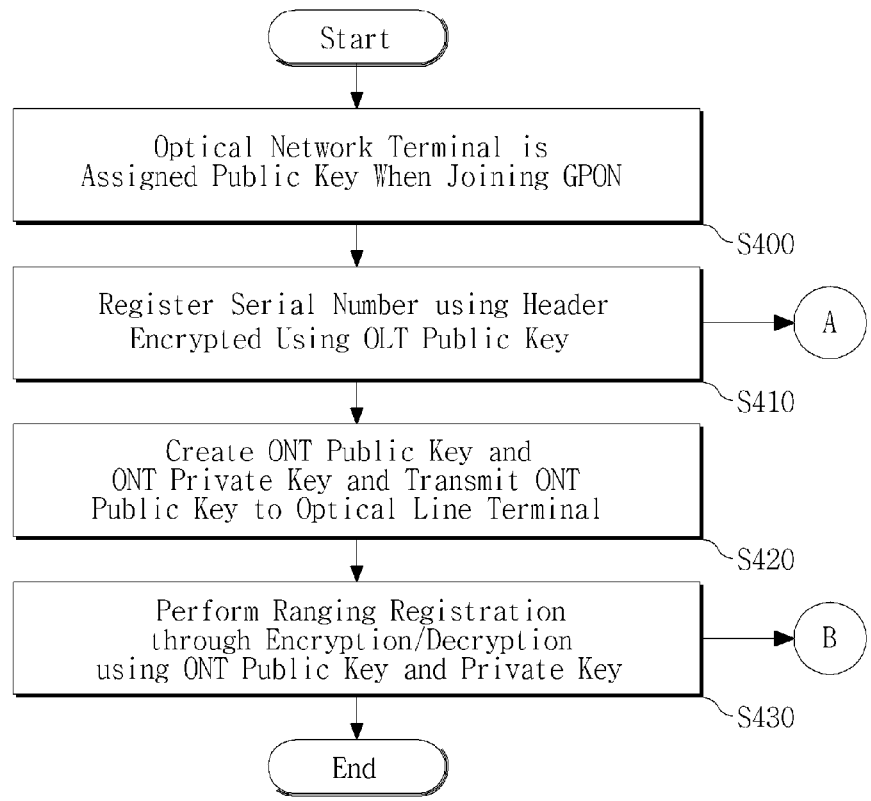
FIG. 6 is a flowchart illustrating a method in which an optical network terminal obtains a registration approval using encryption according to an exemplary embodiment.

FIG. 6 is a flowchart illustrating a method in which the optical network terminal obtains a registration approval using encryption according to an exemplary embodiment.

Referring to FIG. 6, the optical network terminal is assigned an OLT public key when the optical network terminal is installed in the GPON (S400). Then, the optical network terminal encrypts a GPON frame using the OLT public key, and transmits the encrypted GPON frame to an optical line terminal, thereby obtaining registration of a serial number of the optical network terminal from the optical line terminal (S410). Thereafter, the optical network terminal creates an ONT public key and an ONT private key, and transmits the ONT public key to the optical line terminal (S420). Then, the optical network terminal decrypts a GPON frame received from the optical line terminal using the ONT private key, and applies an equalization delay value which is the result of the decryption (S430). When GPON frames are encrypted, in the process of serial number registration, PLOAM messages are encrypted using the private key and public key of the optical line terminal, and in the process of ranging registration, PLOAM messages are encrypted using the private key and public key of the optical network terminal.

The processes in which the optical network terminal obtains serial number registration and ranging registration will be described in more detail later with reference to FIGS. 7 and 8. For convenience of description, the optical network terminal will be described after with reference to hardware and software aspects. That is, the optical network terminal may be divided into encryption/decryption software for encrypting or decrypting PLOAM messages, a PLOAM transceiver for receiving or transmitting encrypted/decrypted PLOAM messages and MAC hardware which operates based on the GPON standard. This reason for dividing the optical network into hardware and software aspects for description is to show the advantage that the encryption algorithm according to the current embodiment is implemented at software level such that it can be applied easily without having to modify the hardware of an existing GPON system.

Figure 7:
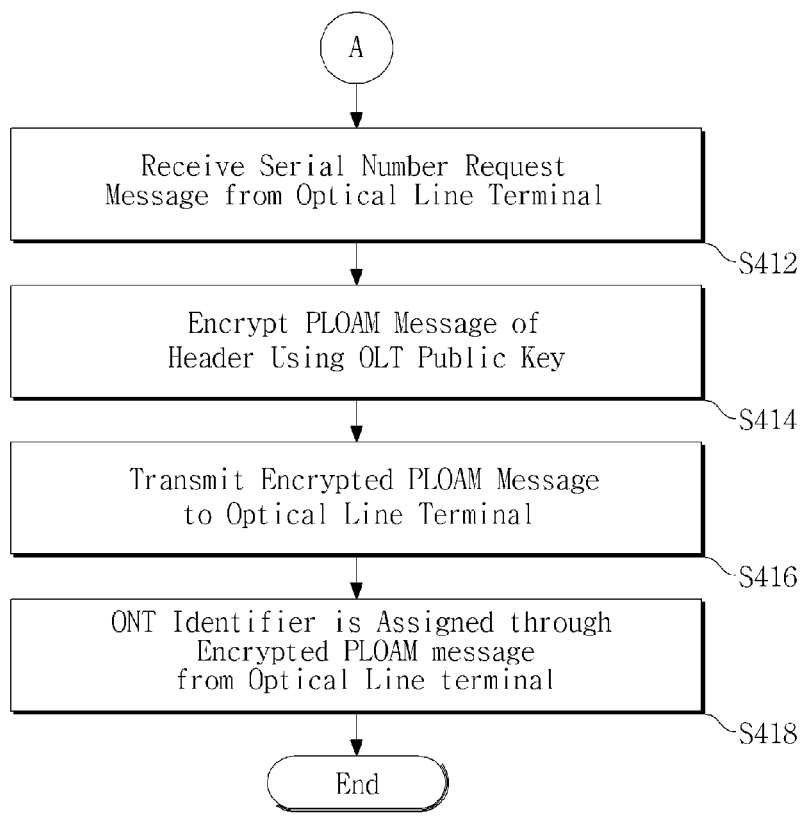
FIG. 7 is a flowchart illustrating a method of registering a serial number of the optical network terminal, according to an exemplary embodiment.

FIG. 7 is a flowchart illustrating a method of registering a serial number of the optical network terminal, according to an exemplary embodiment. Hereinafter, the method of registering the serial number of the optical network terminal will be described in detail with reference to FIG. 7.

1. Receive a Serial Number Request Message from the Optical Line Terminal (S412).

First, the MAC hardware of the optical network terminal is assigned an OLT public key which is commonly used in a GPON, when the optical network terminal is installed in the GPON. Thereafter, the MAC hardware receives a serial number request message from the optical line terminal. Before receiving the serial number request message, the MAC hardware receives a frame to which no bandwidth is assigned twice from the optical line terminal. This frame opens a quiet zone of 250 us, thus making the optical network terminal transmit the serial number response message.

2. Encrypt a PLAOM Message of a Header Using the OLT Public Key (S414)

If the serial number request message is received from the optical line terminal, the PLOAM software transfers a serial number PLOAM message to the encryption/description software. Then, the encryption/decryption software encrypts the serial number PLOAM message, using the OLT public key.

3. Transmit the Encrypted PLOAM Message to the Optical Line Terminal (S416).

The encrypted serial number PLOAM message is transferred as a serial number response message to the MAC hardware, and the MAC hardware transmits the serial number response message to the optical line terminal. The serial number response message is decrypted by the optical line terminal.

4. Being Assigned an ONT Identifier by Receiving an Encrypted PLOAM Message from the Optical Line Terminal (S418).

The optical network terminal is assigned an ONT identifier ONT_ID for the corresponding serial number from the optical line terminal according to the result of decryption by the optical line terminal. The optical network terminal is assigned the ONT identifier ONT_ID by receiving an encrypted PLOAM message from the optical line terminal. The MAC hardware transfers the received PLOAM message to the encryption/description software when receiving two or more regular PLOAM messages. Then, the encryption/decryption unit decrypts the encrypted PLOAM message using the OLT public key, so that the ONT identifier ONT_ID is assigned to the optical network terminal. Accordingly, the process of serial number registration is complete. Since in the process of serial number registration, the ONT identifier ONT_ID has been assigned for the serial number of the MAC hardware, a public key and private key created by each optical network terminal can be used in the following ranging registration process.

Figure 8:
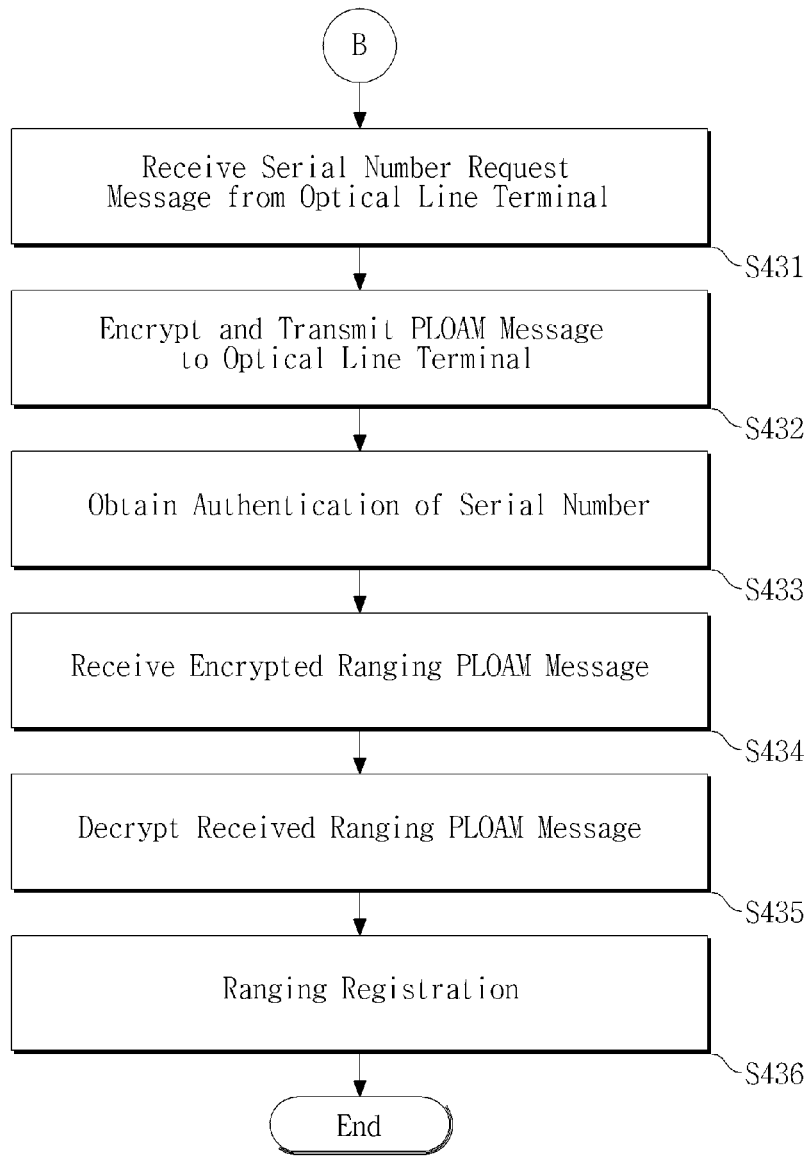
FIG. 8 is a flowchart illustrating a method in which the optical network terminal obtains ranging registration, according to an exemplary embodiment.

FIG. 8 is a flowchart illustrating a method in which the optical network terminal obtains ranging registration, according to an exemplary embodiment. Hereinafter, the method in which the optical network terminal obtains ranging registration will be described in detail with reference to FIG. 8.

1. Receive a serial number request message from the optical line terminal (S431).

2. Encrypt a PLOAM message and transmit the encrypted PLOAM message to the optical line terminal (S432).

The MAC hardware of the optical network terminal transfers a serial number PLOAM message which is to be used to respond to a ranging request message, to the encryption/decryption software. The encryption/description software encrypts the serial number PLOAM message using a private key created by the MAC hardware. The encrypted serial number PLOAM message is transferred to the MAC hardware and then transmitted to the optical line terminal.

3. Obtain authentication of the transmitted serial number (S433).

The optical line terminal decrypts the encrypted serial number PLOAM message, and authenticates the serial number according to the result of the decryption.

4. Receive an encrypted ranging PLOAM message (S434).

The optical network terminal receives an equalization delay value for the ONT identifier ONT_ID through an encrypted ranging PLOAM message from the optical line terminal. The MAC hardware receives the encrypted ranging PLOAM messages three times from the optical line terminal.

5. Decrypt the received ranging PLOAM message (S435).

The MAC hardware, when receiving the ranging PLOAM message regularly encrypted twice or more, transfers the ranging PLOAM message to the encryption/decryption software. The encryption/decryption software decrypts the encrypted PLOAM message using the private key of the MAC hardware, thus being assigned an equalization delay value. Accordingly, the process of ranging registration is complete.

Therefore, in the GPON system using the public key encryption algorithm, unauthorized optical network terminals which have duplicated a serial number of an authorized optical network terminal may not be registered in an optical line terminal since they do not know a public key of the optical line terminal.

Hereinafter, a method in which the optical line terminal authenticates registration of the optical network terminal using encryption will be described in detail with reference to FIGS. 9 through 11, wherein the method is composed of: serial number registration, public key distribution and ranging registration.

Figure 9:
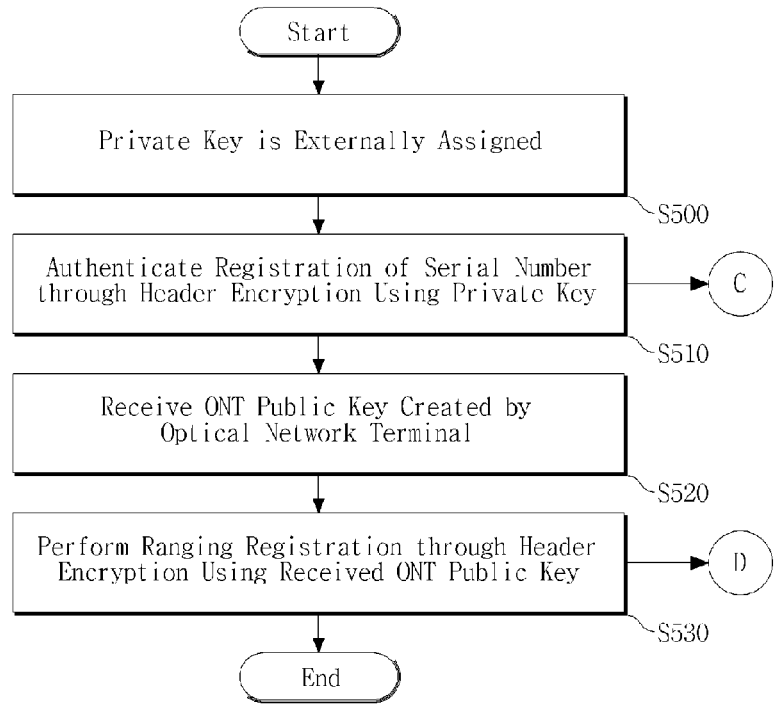
FIG. 9 is a flowchart illustrating a method in which the optical line terminal authenticates registration of the optical network terminal using encryption according to an exemplary embodiment.

FIG. 9 is a flowchart illustrating a method in which the optical line terminal authenticates registration of the optical network terminal using encryption according to an exemplary embodiment.

Referring to FIG. 9, the optical line terminal is externally assigned an OLT private key (S500). Then, the optical line terminal authenticates registration of a serial number through header encryption using the OLT private key (S510). Thereafter, ranging registration is performed through header encryption using a received ONT public key (S530). In the process of serial number registration, PLOAM messages are encrypted using the private key and public key of the optical line terminal, and in the process of ranging registration, PLOAM messages are encrypted using the private key and public key of the optical network terminal.

A method in which the optical line terminal registers a serial number and performs ranging registration will be described in detail with reference to FIGS. 10 and 11. The optical line terminal will be described after being divided into hardware and software aspects. The optical line terminal may be divided into encryption/decryption software for encrypting or decryption PLOAM messages, a PLOAM transceiver for transmitting and receiving encrypted/decrypted PLOAM messages and MAC hardware which operates based on the GPON standard. The reason for dividing the optical network into hardware and software aspects for description is to show the advantage that the encryption algorithm according to the current embodiment is implemented at software level such that it can be applied easily without having to modify the hardware of an existing GPON system.

Figure 10:
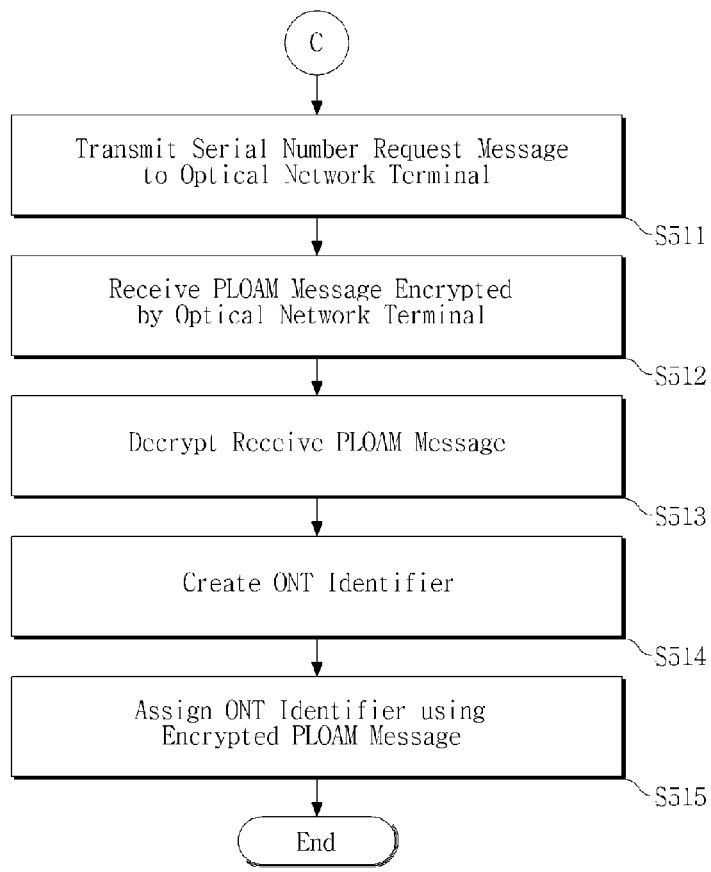
FIG. 10 is a flowchart illustrating a method in which the optical line terminal registers a serial number of the optical network terminal, according to an exemplary embodiment.

FIG. 10 is a flowchart illustrating a method in which the optical line terminal registers a serial number of the optical network terminal, according to an exemplary embodiment.

Hereinafter, the method in which the optical line terminal registers the serial number of the optical network terminal will be described in detail.

1. Transmit a Serial Number Request Message to the Optical Network Terminal (S511)

First, the MAC hardware of the optical line terminal is assigned a private key which is commonly used in a GPON system. Thereafter, the optical line terminal transmits a serial number request message to the optical network terminal. At this time, the MAC hardware transmits a frame to which no band is assigned twice to the optical network terminal before transmitting the serial number request message to the optical network. This frame opens a quiet zone of 250 us, thus making the optical line terminal receive a serial number response message.

2. Receive an Encrypted PLOAM Message Through the Optical Network Terminal (S512).

The optical network terminal encrypts a serial number PLOAM message and transmits the encrypted serial number PLOAM message as a serial number response message to the optical line terminal, in response to the serial number request message. The MAC hardware of the optical line terminal receives the serial number response message.

3. Decrypt the Serial Received Serial Number PLOAM Message (S513)

When the received serial number PLOAM message is regular, the optical line terminal transmits the serial number PLOAM message to the encryption/decryption software. The encryption/decryption unit decrypts the encrypted serial number PLOAM message using a private key of the MAC hardware.

4. Create an ONT Identifier ONT_ID (S514)

The optical line terminal assigns an ONT identifier ONT_ID to the received serial number, and the ONT identifier is transmitted to the encryption/description software.

5. Assign the ONT Identifier ONT_ID Through an Encrypted PLOAM Message (S515).

The encryption/decryption software encrypts the ONT identifier ONT_ID using a private key of the MAC hardware to generate an encrypted ONT_ID PLOAM message, and transfers the encrypted ONT-ID PLOAM message to the MAC hardware. The MAC hardware transmits the encrypted ONT_ID PLOAM message to the optical network terminal. The encrypted ONT_ID PLOAM message is decrypted by the optical network terminal, and accordingly the process of serial number registration is complete.

Figure 11:
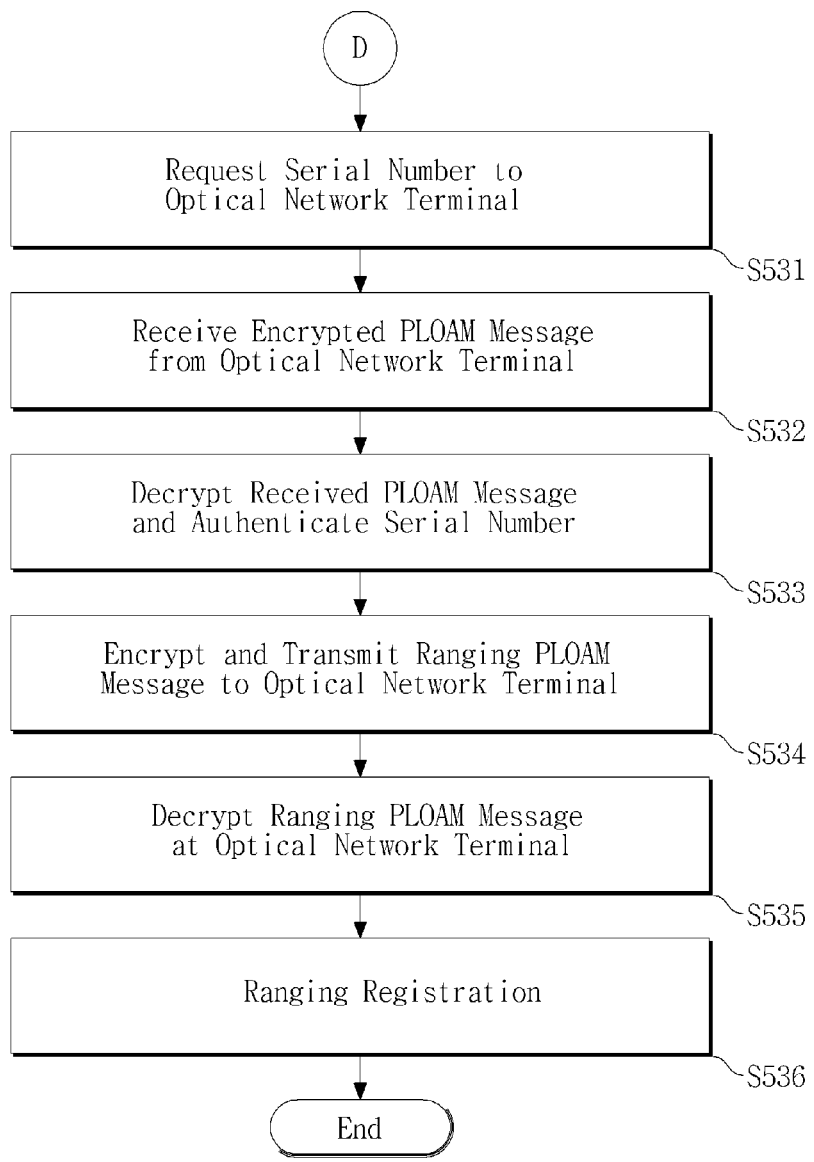
FIG. 11 is a flowchart illustrating a method in which the optical line terminal performs ranging registration, according to an exemplary embodiment.

FIG. 11 is a flowchart illustrating a method in which the optical line terminal performs ranging registration, according to an exemplary embodiment.

1. Request a Serial Number to the Optical Network Terminal (S531)

The MAC hardware of the optical line terminal starts ranging registration of the optical network terminal to which the optical line terminal has assigned an ONT identifier ONT_ID. The MAC hardware transmits a ranging request message to the optical network terminal after transmitting a frame to which no band is assigned twice in order to receive a response to the ranging request message from the optical network terminal.

2. Receive an Encrypted PLOAM Message from the Optical Network Terminal (S532)

The MAC hardware of the optical line terminal receives an encrypted serial number PLOAM message from the optical network terminal.

3. Decrypt the Received PLOAM Message and Authenticate the Serial Number (S533)

If the received serial number PLOAM message is regular, the MAC hardware of the optical line terminal transfers the serial number PLOAM message to the encryption/decryption software. The encryption/decryption software decrypts the serial number PLOAM message, and authenticates registration of the serial number of the optical line terminal according to the result of the decryption.

4. Encrypt a Ranging PLOAM Message and Transmit the Encrypted PLOAM Message to the Optical Network Terminal (S534)

The optical line terminal calculates an equalization delay value EqD for an ONT identifier ONT_ID, and transfers the equalization delay value EqD to the encryption software, and the encryption software encrypts the equalization delay value EqD using the public key of the MAC hardware to generate an encrypted ranging PLOAM message. The encrypted ranging PLOAM message is transferred to the MAC hardware, and the MAC hardware transmits the encrypted ranging PLOAM message three times to the optical network terminal.

5. Decrypt the Ranging PLOAM Message (S535)

If the optical network terminal receives the ranging PLOAM message regularly encrypted twice or more, the ranging PLOAM message is decrypted.

6. Equalize the Distance

Ranging registration of the optical network terminal is completed based on the result of the decryption.

Accordingly, unauthorized optical network terminals that have duplicated the serial number of an authorized optical network terminal cannot be registered in the GPON system since they do not know the public key of the optical line terminal.

Figure 12:
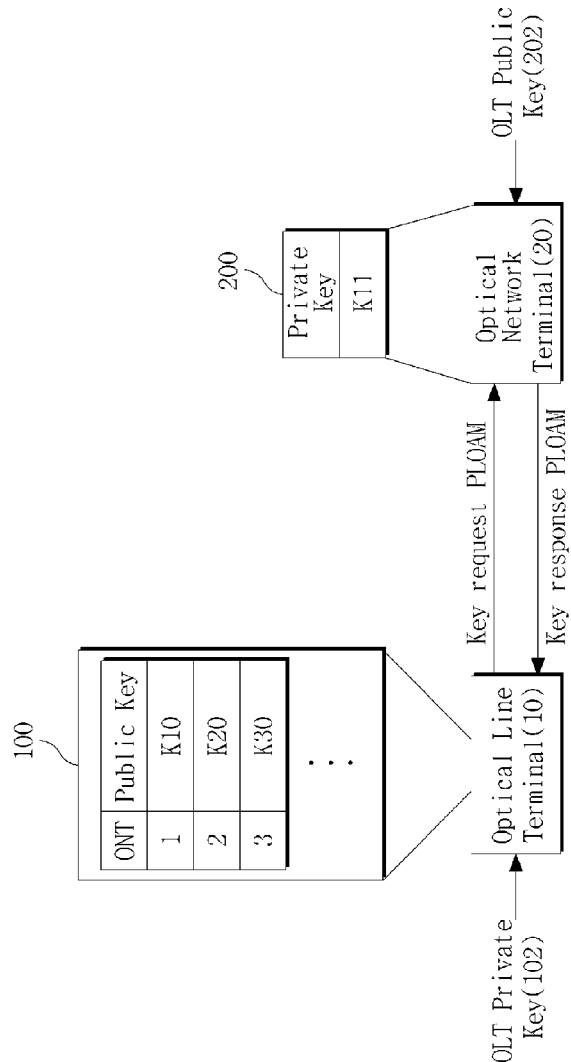
FIG. 12 is a diagram for explaining a key management structure using encryption according to an exemplary embodiment.

FIG. 12 is a diagram for explaining a key management structure using encryption according to an exemplary embodiment.

Referring to FIG. 12, a network operator assigns an OLT private key 102 which is commonly used in the network, to an optical line terminal 10, and assigns an OLT public key 202 to an authorized optical network terminal 20, in order to block registration of unauthorized optical network terminals that have duplicated a serial number of the authorized optical network terminal.

Also, optical network terminals 20 create private keys and public keys that will be used by them, and distribute the public keys to the optical line terminal 10. The optical line terminal 10 has a key table 100 to store its own private key and the public keys received from optical network terminals. Also, each optical network terminal 20 has an OLT public key 202 of the optical line terminal 10 assigned when the optical network terminal 20 is installed, and a private key created by the optical network terminal 20. In the process of serial number registration, PLOAM messages are encrypted using the private key and public key of the optical line terminal 10, and in the process of ranging registration, PLOAM messages are encrypted using the private key and public key of the optical network terminal 20.

Figure 13:
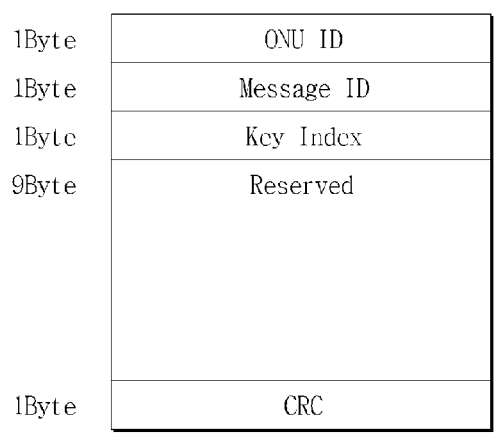
FIG. 13 is a diagram illustrating a structure of a key request PLOAM message using encryption according to an exemplary embodiment.

FIGS. 13 and 14 are diagrams illustrating the structures of a key request PLOAM message and a key response PLOAM message using encryption according to an exemplary embodiment.

Referring to FIGS. 13 and 14, as illustrated in FIG. 13, the key request PLOAM message has 13 bytes. Encryption is performed on 10 bytes of PLOAM message data. In order to distribute keys for public key encryption, a key request PLOAM message includes a field which indicates the type of a requested key. That is, a key index value stored in the field indicates whether an encryption key for data or a public key for encrypting a PLOAM message is requested. If the key index value is 0, this means that an encryption key for data is requested, and if the key index value is 1, this means that a key for encrypting a PLOAM message is requested. The field storing a key index value must not contradict the GPON standard. Meanwhile, as illustrated in FIG. 14, a key response PLOAM message determines whether the key value is for data or for PLOAM, using a key index value defined in the GPON standard.

In summary, the optical network terminal in the GPON obtains a registration approval from the optical line terminal by encrypting a header of a frame associated with registration and transmitting the encrypted header to the optical line terminal. Accordingly, it is possible to securely authenticate registration of authorized optical network terminals and block registration of unauthorized optical network terminals. Furthermore, since the encryption algorithm is implemented using software, it may be easily applied without having to modify hardware.

The registration authentication method as described above can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be efficiently applied to technical fields of network authentication using an encryption technology.

The invention claimed is:

1. A method in which an optical network terminal obtains a registration approval from an optical line terminal in a Gigabit passive optical network (GPON), comprising:
at the optical network terminal, being assigned an optical line terminal (OLT) public key, by the optical line terminal, when the optical network terminal joins the GPON, the OLT public key corresponding to an optical line terminal (OLT) private key assigned to the optical line terminal; and
at the optical network terminal, encrypting a header of a frame associated with registration of the optical network terminal, the header including a physical layer Operations, Administration and Maintenance (OAM) message, using the OLT public key, and obtaining the registration approval from the optical line terminal using the frame with the encrypted header;
wherein the obtaining of the registration approval comprises:
encrypting a physical layer OAM message included in a header of a frame associated with registration of a serial number of the optical network terminal using the OLT public key, transmitting the encrypted physical layer OAM message to the optical line terminal and obtaining registration for the serial number from the optical line terminal; and
at the optical network terminal, generating an optical network terminal (ONT) public key and an ONT private key in response to the obtaining registration for the serial number and transmitting the ONT public key to the optical line terminal.

2. The method of claim 1, further comprising:
encrypting a physical layer OAM message included in a header of a frame associated with ranging registration, using the ONT private key or the ONT public key, transmitting the encrypted physical layer OAM message to the optical line terminal, and obtaining ranging registration for a distance between the optical line terminal and the optical network, from the optical line terminal.

3. The method of claim 2, wherein the obtaining of the registration for the serial number comprises:
receiving a serial number request message from the optical line terminal;
encrypting the physical layer OAM message included in the header of the frame associated with serial number registration using the OLT public key, transmitting the encrypted physical layer OAM message to the optical line terminal, in response to the serial number request message; and
receiving an encrypted physical layer OAM message associated with identifier assignment from the optical line terminal when the serial number has been registered in the optical line terminal, and being assigned an ONT identifier from the optical line terminal.

4. The method of claim 3, wherein the transmitting of the ONT public key to the optical line terminal comprises:
receiving a public key request from the optical line terminal by receiving a physical layer OAM message associated with a key request from the optical line terminal, the key request including a key index field configured to indicate whether an encryption key for data or a public key for encrypting a PLOAM physical layer OAM message is requested; and
transmitting the ONT public key to the optical line terminal by transmitting a physical layer OAM message associated with a key response to the optical line terminal, in response to the public key request.

5. The method of claim 2, wherein the obtaining of the ranging registration for the distance between the optical line terminal and the optical network comprises:
encrypting a physical layer OAM message associated with serial number authentication using the ONT private key, in response to a serial number request from the optical line terminal, transmitting the encrypted physical layer OAM message to the optical line terminal and acquiring serial number authentication from the optical line terminal; and
receiving an equalization delay value from the optical line terminal by receiving an encrypted ranging physical layer OAM message from the optical line terminal.

6. The method of claim 5, wherein the receiving of the equalization delay value comprises:
receiving the encrypted ranging physical layer OAM message from the optical line terminal, wherein the ranging physical layer OAM message has been encrypted using the ONT public key; and
receiving the equalization delay value by decrypting the ranging physical layer OAM message using the ONT private key.

7. A method in which an optical line terminal authenticates registration of an optical network terminal in a Gigabit passive optical network (GPON), comprising:
at the optical line terminal, being assigned an optical line terminal (OLT) private key and assigning an optical line terminal (OLT) public key to the optical network terminal when the optical network terminal joins the GPON;
at the optical line terminal, decrypting a header of a frame associated with the registration of the optical network terminal, the header including a physical layer Operations, Administration and Maintenance (OAM) message, using the OLT private key, and registering the optical network terminal using the frame with the decrypted header;
wherein the registration of the optical network terminal comprises:
decrypting a physical layer OAM message included in a header of a frame associated with registration of a serial number of the optical network terminal using the OLT private key, authenticating the serial number of the optical network terminal associated with the registration and sending a registration approval for the serial number to the optical network terminal; and receiving an optical network terminal (ONT) public key created by the optical network terminal from the optical network terminal in response to the registration of the serial number being authenticated.

8. The method of claim 7, further comprising:
encrypting a ranging physical layer OAM message using the ONT public key and transmitting the encrypted ranging physical layer OAM message to the optical network terminal, thereby performing ranging registration for a distance between the optical line terminal and the optical network.

9. The method of claim 8, wherein the registering of the serial number of the optical network terminal comprises:
transmitting a serial number request message to the optical network terminal; receiving the physical layer OAM message associated with serial number registration from the optical network terminal, in response to the serial number request message, wherein the physical layer OAM message associated with serial number registration has been encrypted using an OLT public key;
decrypting the physical layer OAM message associated with serial number registration using the OLT private key to generate an ONT identifier; and
transmitting the ONT identifier through a physical layer OAM message associated with identifier assignment to the optical network terminal, thus assigning the ONT identifier to the optical network terminal.

10. The method of claim 8, wherein the receiving of the ONT public key comprises:
transmitting a physical layer OAM message associated with key request to the optical network terminal to request the ONT public key; and
receiving the ONT public key through a physical layer OAM message associated with response to a key request from the optical network terminal in response to the request of the ONT public key.

11. The method of claim 8, wherein the performing of the ranging registration comprises:
requesting a serial number of the optical network terminal to be sent to the optical line terminal;
receiving the serial number of the optical network terminal through an encrypted physical layer OAM message associated with serial number registration from the optical network terminal in response to the request;
decrypting the encrypted physical layer OAM message associated with serial number registration using the OLT private key, thus authenticating the serial number of the optical network terminal; and
encrypting the ranging physical layer OAM message using the ONT public key and transmitting the encrypted ranging physical layer OAM message to the optical network terminal, thus assigning an equalization delay value for ranging registration to the optical network terminal.

12. An optical network terminal which obtains a registration approval from an optical line terminal in a Gigabit Passive Optical Network (GPON), the optical network terminal comprising:
an encryption/decryption unit to encrypt a physical layer Operations, Administration and Maintenance (OAM) message included in a header a frame associated with registration of a serial number of the optical network terminal using an optical network terminal (OLT) public key assigned to the optical network terminal, by the optical line terminal, when the optical network terminal joins the GPON, the OLT public key corresponding to an optical line terminal (OLT) private key assigned to the optical line terminal, to transmit the encrypted physical layer OAM message to the optical line terminal, and to decrypt a physical layer OAM message associated with the registration approval received from the optical line terminal using the OLT public key;
an authentication unit obtaining the registration approval from the optical line terminal according to the result of the decryption; and
a key creator to create an optical network terminal (ONT) private key and an ONT public key and transmit the ONT public key to the optical line terminal in response to the authentication unit obtaining the registration approval according to the result of the decryption.

13. The optical network terminal of claim 12, wherein the encryption/decryption unit encrypts or decrypts a 10-byte data area of a physical layer OAM message included in the header of the frame associated with registration.

14. The optical network terminal of claim 12, wherein the encryption/decryption unit encrypts a physical layer OAM message associated with registration of a serial number, which is included in the header of the frame associated with registration, using the OLT public key.

15. The optical network terminal of claim 12, wherein the encryption/decryption unit encrypts a ranging physical layer OAM message included in the header of the frame associated with registration, using the ONT private key, in order to acquire authentication of a serial number for ranging registration.

16. An optical line terminal which performs registration authentication of an optical network terminal in a Gigabit Passive Optical Network (GPON), the optical line terminal comprising:
an encryption/decryption unit to receive and decrypt a physical layer Operations, Administration and Maintenance (OAM) message included in a header of a frame associated with registration of a serial number of the optical network terminal using an optical line terminal (OLT) private key assigned to the optical line terminal, the OLT private key corresponding to an optical line terminal (OLT) public key assigned to the optical network terminal, by the optical line terminal, when the optical network terminal joins the GPON;
an authentication unit to authenticate registration of the serial number of the optical network terminal according to the result of the decryption; and
a key table created to store a received optical network terminal (ONT) public key, the ONT public key corresponding to an optical network terminal (ONT) private key stored on the optical network terminal, wherein the ONT public key is received from the optical network terminal in response to the registration of the serial number being authenticated.

17. The optical line terminal of claim 16, wherein the encryption/decryption unit encrypts or decrypts a 10-byte data area of a physical layer OAM message included in the header of the frame associated with registration.

18. The optical line terminal of claim 16, wherein if the encryption/decryption unit receives a physical layer OAM message associated with registration of a serial number, encrypted using an ONT private key created by the optical network terminal, in order to authenticate a serial number for ranging registration, the encryption/decryption unit decrypts the physical layer OAM message using the ONT public key.

19. A Gigabit Passive Optical Network (GPON) comprising:
an optical network terminal configured to:
encrypt or decrypt a physical layer Operations, Administration and Maintenance (OAM) message included in a header of a frame associated with registration of a serial number of the optical network terminal using an optical line terminal (OLT) public key assigned to the optical network terminal, by an optical line terminal, when the optical network terminal joins the GPON, the OLT public key corresponding to an optical line terminal (OLT) private key assigned to the optical line terminal, transmit the encrypted physical layer OAM message to the optical line terminal, decrypt a physical layer OAM message associated with a registration approval of the serial number received from the optical line terminal using the OLT public key, create an optical network terminal (ONT) private key and an optical network terminal (ONT) public key, the ONT public key corresponding to the ONT private key, and transmit the ONT public key to the optical line terminal in response to obtaining the registration approval from the optical line terminal; and the optical line terminal configured to:

encrypt or decrypt a physical layer Operations, Administration and Maintenance (OAM) message included in a header of a frame associated with the registration of the serial number using the private OLT key assigned or the ONT public key created by and received from the optical network terminal, authenticate the registration of the serial number according to the result of the encryption or decryption of the header of the frame, and store the received ONT public key in response to the registration of the serial number being authenticated.

* * * * *